United States Patent [19]

Ciocan

[11] 4,417,741
[45] Nov. 29, 1983

[54] PORTABLE DEFLECTOR SHIELDS

[76] Inventor: Benjamin Ciocan, 29154 Campbell Dr., Warren, Mich. 48093

[21] Appl. No.: 339,919

[22] Filed: Jan. 18, 1982

[51] Int. Cl.³ .................... B62D 25/16; A47B 96/00
[52] U.S. Cl. .............. 280/154.5 R; 248/201
[58] Field of Search .............. 280/154.5 R, 153 R, 280/154; 248/201, 214, 206 A; 160/DIG. 4, 40, 330; 150/53; 293/DIG. 6, 112, 118, 119, 34; 296/185, 187, 188, 198, 197

[56] References Cited

U.S. PATENT DOCUMENTS

| | | | |
|---|---|---|---|
| 446,681 | 2/1891 | Holden | 248/214 |
| 1,680,504 | 8/1928 | Cutler | 280/153 R |
| 1,791,696 | 2/1931 | Alexander | 248/201 |
| 2,302,300 | 11/1942 | Davies | 248/201 |
| 2,452,645 | 11/1948 | Firsel | 248/214 |
| 2,605,119 | 7/1952 | Earnest | 280/154.5 R |
| 3,866,943 | 2/1975 | Innis | 280/154.5 R |
| 3,876,229 | 4/1975 | Kohr | 280/154.5 R |
| 3,922,003 | 11/1975 | Lea | 280/154.5 R |
| 4,042,200 | 8/1977 | Overall | 248/214 |
| 4,268,053 | 5/1981 | Toppins | 280/154.5 R |

FOREIGN PATENT DOCUMENTS 1314465  12/1962  France .................. 280/154.5 R

*Primary Examiner*—Joseph F. Peters, Jr.
*Assistant Examiner*—Timothy Roesch
*Attorney, Agent, or Firm*—Robert P. Gibson; Peter A. Taucher; John E. McRae

[57] ABSTRACT

An add-on debris deflector for use on trailers or tractors to meet temporary situations when the trailer or tractor is operated in other than its conventional mode. The deflector is designed for installation on the vehicle without special tools or vehicle modification. It is especially useful on military tractor-trailer systems in which the use of a permanent debris deflector on the trailer might present structural interference between the deflector and a part of the tractor during vehicle turning action.

9 Claims, 10 Drawing Figures

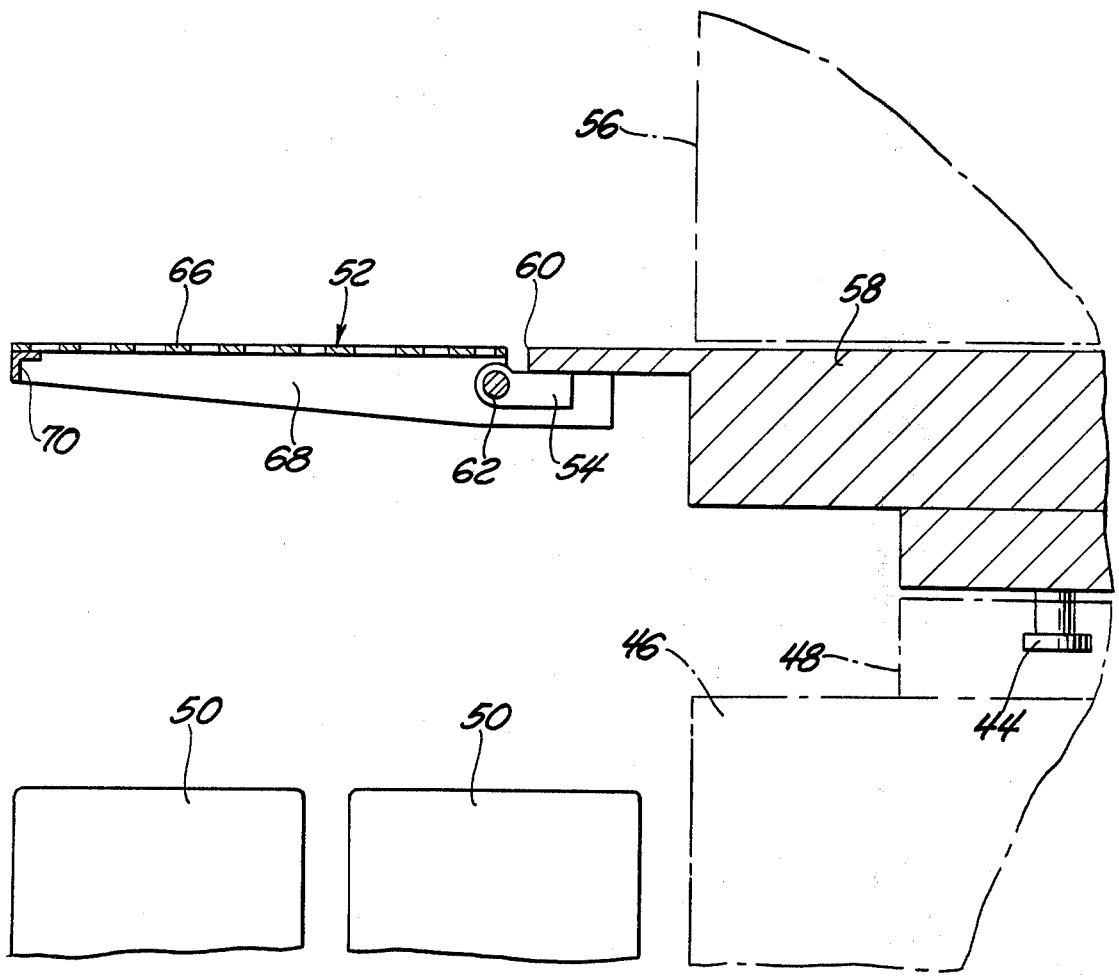
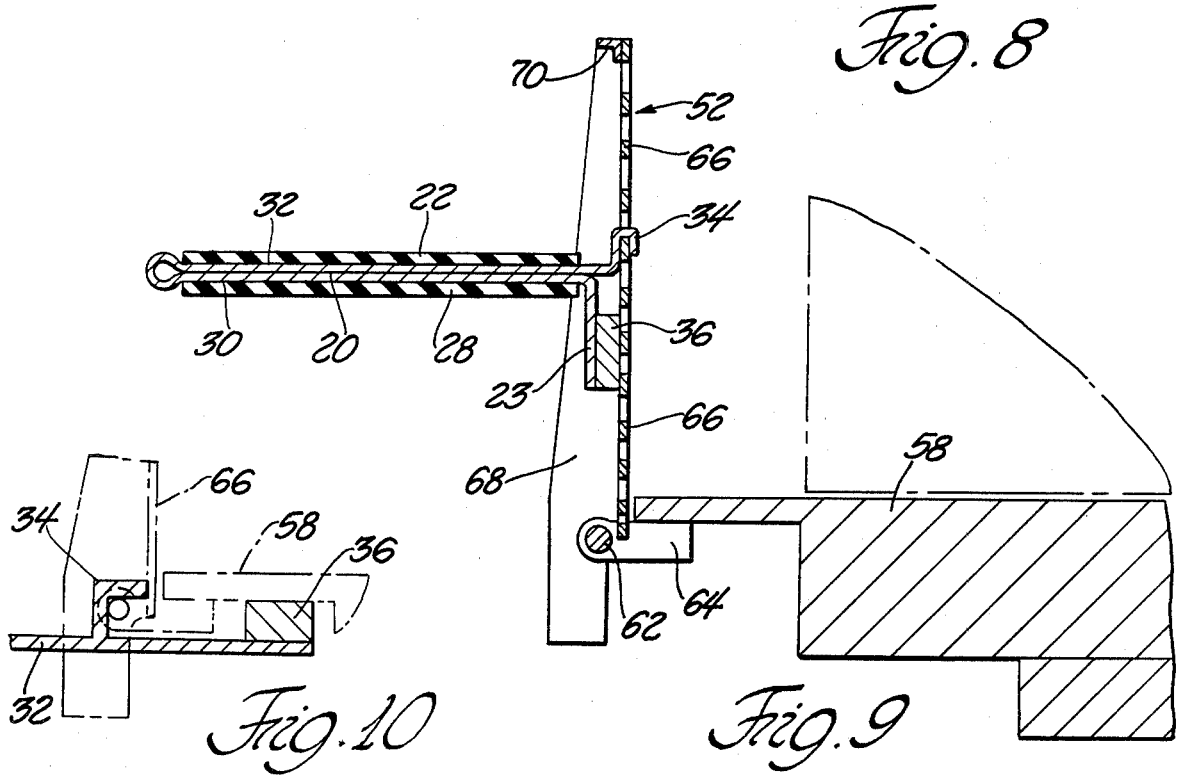

PORTABLE DEFLECTOR SHIELDS

GOVERNMENT INTEREST

The invention described herein may be manufactured, used and licensed by or for the Government for governmental purposes without payment to me of any royalty thereon.

BACKGROUND AND SUMMARY OF INVENTION

This invention relates to a portable add-on fender unit for tractors and/or trailers to provide temporary protection from water spray and debris discharged by the road wheels. The invention is especially suited for use on vehicles where permanent fenders are not feasible due to design constraints on mounting space, vehicle weight, wheel turning action, or interference by other vehicle structure during vehicle turn actions. Principal objects of the invention are to provide temporary add-on fenders that can be manufactured at low cost and applied to a range of tractor-trailer systems without special tools or modifications to the vehicle.

THE DRAWINGS

FIGS. 4 and 5 show methods for attaching fender bracketry to non-ferrous material structures, such as aluminum.

FIG. 8 shows a second vehicle that can accommodate my improved fender.

FIG. 9 shows my fender installed on the FIG. 8 vehicle.

FIG. 10 illustrates a variant of the structure shown in FIG. 9.

Figure 1:
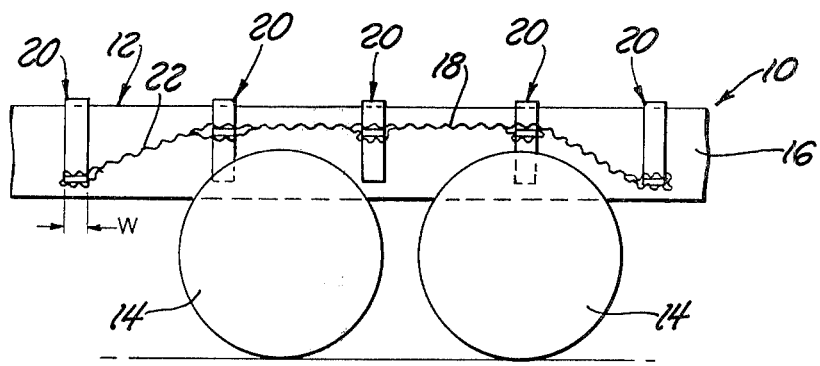
FIG. 1 is a fragmentary side elevational view of a tractor or trailer having my invention installed thereon.

Referring more particularly to FIG. 1, there is shown a vehicle 10 that includes a longitudinal frame 12 and tandem road wheels 14 connected to the frame by resilient suspension means, not shown; usual suspension is leaf springs and/or air bags. Frame 12 comprises two parallel beams, one of which is shown at 16 in FIGS. 2 through 4.

Figure 2:
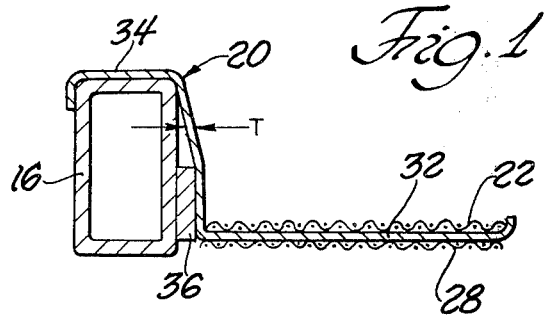
FIGS. 2 through 5 illustrate various bracket structures that can be used to attach my improved fender on the vehicle.
Figure 3:
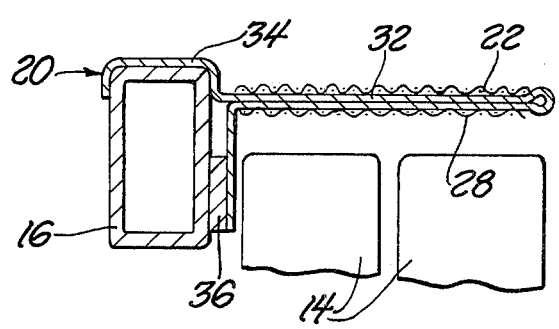
Figure 6:
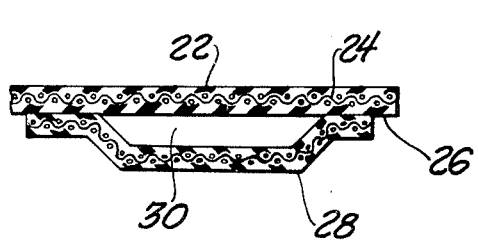
FIG. 6 shows the general cross-section of a rubberized fabric used in my improved fender.

My invention relates to an add-on fender 18 that includes five separate brackets 20 adapted to occupy different stations along beam 16. The two endmost brackets may be constructed as shown in FIG. 2; the three intermediate brackets may be constructed as shown in FIG. 3. The five brackets collectively support a fabric element 22 having a length somewhat longer than the longitudinal space occupied by ground wheels 14; the width of fabric element 22 may be approximately the same as the transverse distance from frame member 16 to the outboard edges of the ground wheels. The fabric element is preferably formed of rubberized fabric similar to that used in conventional raincoats, mud flaps, rubber footwear, etc. FIG. 6 illustrates the fabric cross-section as including interior cord or cords 24 and rubber coating or cover 26.

At spaced points along its length fabric element 22 has transverse strips 28 sewn, cemented, bonded or otherwise secured to the fabric element undersurface. Each strip 28 forms a narrow pocket 30 extending along the width dimension of the fabric element for insertion over support arm sections 32 of support brackets 20. FIGS. 2 and 3 best illustrate the bracket construction.

The bracket shown in FIG. 2 comprises an inverted U-shaped hook section 34 adapted to hook over frame member 16 to preclude removal of the bracket in a downward direction. A permanent magnet 36 is suitably secured to the bracket to exert a clamp action on the outer side surface of frame member 16, thereby precluding removal of the bracket in the upward tilt direction. The aforementioned arm section 32 of the bracket extends horizontally outwardly from hook section 34 to fit into the aforementioned pockets 30 carried by fabric element 22. The outer tip end of arm section 32 should be enlarged or deformed to minimize the possibility of the fabric element working off of arm section 32 while the vehicle is in motion. In service, the weight of fabric element 22 on arm section 32 produces a force moment that causes magnet 36 to tightly press against frame 16, to thus assist in fender retention on the vehicle.

The bracket shown in FIG. 3 is similar to the FIG. 2 bracket except that arm section 32 is located higher up relative to hook section 34. The aim is to use the FIG. 2 brackets at the front and rear ends of the fender, and the FIG. 3 brackets at intermediate points along the fender, whereby the fabric element leading and trailing areas are inclined to conform to the wheel contour, as shown in FIG. 1.

It is preferred to use at least four brackets; however for illustration purposes FIG. 1 shows five brackets. The number of brackets is somewhat related to the wheel dimensions and numbers of wheels, i.e. single wheels or tandem wheels.

Figure 4:
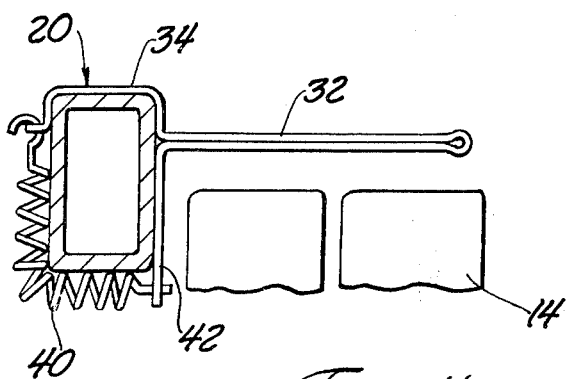

FIG. 4 shows an alternate clamping means other than the permanent magnet of FIGS. 2 and 3 for afixing the bracket to nonferreous structures. The FIG. 4 clamping means comprises a tensioned coil spring 40 or a bunge cord (rubber elastic cord) with hooks. Flexible elastic spring or cord 40 has its opposite ends anchored to the hook section 34 and a leg 42 extending from arm section 32, whereby the spring or elastic cord encircles frame 16 to maintain bracket 20 in place on the frame. The spring is disengaged from either one of the anchorage points to remove the bracket from frame 16.

Figure 5:
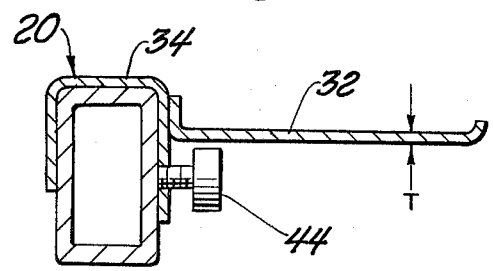

FIG. 5 shows another variation wherein the permanent magnet is replaced by a thumb set screw 44.

The fender assembly and bracketry shown in FIGS. 1 through 6 are designed for use in tractor-trailer systems, to fit on a conventional trailer frame or conventional tractor frame. As applied to a tractor, the fender would fit on the frame over the rear road wheels, at each side of the vehicle, to deflect mud spray or debris discharged by the wheels when the tractor is operating alone, i.e. without the trailer. As applied to a trailer, the fender would be applied over the road wheels at the extreme rear end of the trailer to prevent debris from contacting the trailer underbody or cargo or equipment overhanging the wheels. The add-on fender is visualized as a thin low cost system that occupies very little space over the roadwheels, thus permitting use in situations where a bulky contoured permanent steel fender may not be feasible. The flexibility of fabric element 22 enables the element to bend around obstructions in its immediate vicinity to facilitate fender installation. Brackets 20 can be shifted along the frame to various positions, consistent with the presence of obstructions and the spacing of pockets 30 along fabric element 22. Bracket 20 spacing is preferably selected to achieve a fairly taut condition of the fabric element, with minimum vibration or fluttering while the vehicle is in motion. Fluttering action can be prevented by using stiff heavy gage fabric material, but at the expense of added weight and bracket loading.

Figure 7:
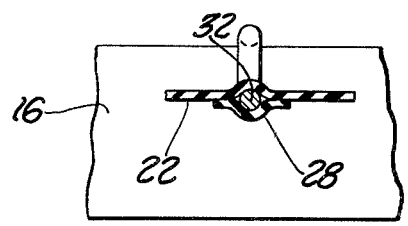
FIG. 7 is a fragmentary cross-sectional view through another structural arrangement embodying my invention.

Each bracket 20 is preferably formed of a steel strap having a cross-sectional width dimension W (FIG. 1) that is at least three times its cross-sectional thickness dimension T (FIG. 2). The width dimension W of the bracket is oriented normal to the general plane of the bracket to provide extensive surface area friction engagement of the bracket hook portion 34 on the vehicle frame. An alternate construction would be the use of round bar stock formed to configurations shown in FIGS. 2 through 5. FIG. 7 is a transverse cross-sectional view taken through a structural arrangement wherein round bar stock is used to form the fender support brackets; each pocket 30 would conform to the round contour of the support arm 32.

FIGS. 8 and 9 show the invention applied to a specialized semitrailer used by the military for missile launch-control operations; the trailer is at the present time designated as the Patriot XM860. FIG. 8 is a transverse cross-sectional view taken through the trailer on a vertical plane passing through the king pin 44, i.e. near the trailer front end. The rear end area 46 of the associated tractor is equipped with a fifth wheel 48 that receives the trailer king pin for towing purposes. The tractor rear wheels 50 are located outboard from the fifth wheel and somewhat behind the leading end of the trailer.

This particular trailer is equipped with two folding walkways, one of which is shown at 52 in FIG. 7, with the vehicle in the implaced stationary position. Each walkway extends rearwardly from the front end of the trailer for a distance of about nine feet to permit human technicians to gain access to equipment 56 mounted on floor 58 of the trailer. FIG. 8 shows one walkway located outboard from side edge 60 of floor 58; a similar walkway, not shown, is provided at the other side edge of floor 58.

Each walkway 52 is mounted on the trailer for swinging motion to the upraised position of FIG. 9 before the vehicle is put into motion. In the FIG. 9 position walkway 52 effectively reduces the transverse width of the trailer front end and thus prevents structural interference that would otherwise exist between the tractor cab, spare tire carrier, mounted equipment, and trailer during vehicle turning motions. Were it not for this interference condition walkways 52 could be built as rigid parts of the trailer.

The pivot structure for walkway 52 comprises aligned hinge pins or an elongated rod 62 secured to floor 58 by a series of spaced brackets 64. Walkway 52 is comprised of expanded metal plates 66 secured to spaced transverse support brackets 68 that are swingable as a unit on rod 62; a reinforcement angle stock bar 70 interconnects the various walkway support brackets 68 at their outer ends to provide a stiff walkway structure.

My invention, as applied to the FIG. 8 vehicle, includes a number of brackets 20, each having a hook section 34 adapted to hook through expanded metal plate 66 when it is in its upraised position. Each bracket 20 has an elongated arm section 32 extending generally horizontally for penetration through a pocket 30 on a fabric element 22. A permanent magnet 36 is suitably affixed to wall 23 of bracket 20 to exert a clamp action on the trailer walkway plate 66. Each bracket 20 could be mounted on hinge pin(s) 62 by using a slightly altered hook 34—magnet 36 system, as shown in FIG. 10.

The fabric element 22 of FIG. 9 is generally the same design as the corresponding element shown in FIG. 1. However each bracket 20 is disposed at the same level so that element 22 has a generally flat horizontal attitude in its supported position. The various brackets 20 are positioned so that the frontmost bracket is set back slightly from the trailer front end, at least far enough to avoid the structural interference problem that exists during vehicle turning maneuvers. When the vehicle arrives at its destination the add-on fender, comprised of brackets 20 and fabric element 22, is removed from the trailer, dismantled and stowed in a stowage box. Walkway 52 is pivoted down to the use position of FIG. 8.

The arrangements of FIGS. 9 and 10 may be considered as an adaptation of the more generalized add-on fender design shown in FIGS. 1 through 6. The permanent magnets 36 are utilized in the arrangements of FIGS. 9 and 10 in such a way that the weight of the fabric material used for element 22 exerts a force moment tending to press the magnets tightly against the vehicle.

I wish it to be understood that I do not desire to be limited to the exact details of construction shown and described for obvious modifications will occur to a person skilled in the art.

I claim:

1. In a vehicle that includes a frame and ground wheels located outboard from the frame so that the space directly above and behind a given wheel is free to receive mud or debris discharged by the wheel: the improvement comprising a portable add-on fender adapted to occupy the aforementioned space for intercepting and deflecting the mud and/or debris; said fender comprising a number of separately-formed brackets adapted to occupy different stations along the frame; each bracket comprising a hook section adapted to hook over the frame to preclude removal of the bracket in a first direction, a clamping section adapted to engage the frame to preclude removal of the bracket in a second direction, and a support arm section directed horizontally outwardly from the hook section and normal to the longitudinal axis of the vehicle frame when the bracket is in its installed position; said fender further comprising a fabric element having a longitudinal dimension corresponding to the spacing of the brackets along the vehicle frame and a width dimension corresponding to the transverse distance between the frame and the outboard edges of the ground wheels; said fabric element having a series of relatively narrow pockets extending along the width dimension of the element to fit onto the support arm sections of the brackets.

2. The improvement of claim 1 wherein the clamping section of each bracket takes the form of a permanet magnet acting in combination with a force moment arm caused by the aforementioned support arm section and the weight of fabric material being used.

3. The improvement of claim 1 wherein the clamping section of each bracket comprises a tensioned elastic element having its opposite ends anchored to said hook section and said support arm section for encirclement of the vehicle frame to maintain the bracket in place on said frame.

4. The improvement of claim 1 wherein the fabric element is formed of rubberized cloth material foldable for easy stowage and portability.

5. The improvement of claim 1 wherein the ground wheels are in tandem relation; there being at least four brackets adapted to occupy different stations along the frame in the space above the tandem wheels; a first one of said brackets being locatable in front of the leading ground wheel, a second one of said brackets being locatable behind the trailing ground wheel, and the remaining brackets being locatable between the first and second brackets.

6. The improvement of claim 5 wherein the first and second brackets are configured so that their support arm sections are below the support arm sections for the other brackets when said brackets are installed on the vehicle frame, whereby the leading and trailing areas of the fabric element are inclined to conform to ground wheel contour.

7. The improvement of claim 1 wherein the brackets are manually adjustable along the vehicle frame to tighten the fabric element on the support arms.

8. The improvement of claim 1 wherein the bracket hook sections and support arm sections are formed of steel strap having a width dimension that is at least three times its thickness dimension; the width dimension of the steel strap being normal to the general plane of the bracket to provide extensive surface area engagement of the bracket on the vehicle frame.

9. The improvement of claim 1 wherein the bracket hook sections and support arm sections are formed of round bar stock.

* * * * *